United States Patent
Baras et al.

(10) Patent No.: US 12,524,986 B2
(45) Date of Patent: Jan. 13, 2026

(54) SYSTEMS AND METHODS FOR COMPARING DISTANCE BETWEEN EMBEDDING OF IMAGES TO THRESHOLD TO CLASSIFY IMAGES AS CONTAINING THE SAME OR DIFFERENT OCCURRENCE OF EVENT INDICATORS

(71) Applicant: Given Imaging LTD., Yoqneam (IL)

(72) Inventors: Dorit Baras, Haifa (IL); Eyal Dekel, Haifa (IL)

(73) Assignee: Given Imaging LTD., Yoqneam (IL)

( * ) Notice: Subject to any disclaimer, the term of this patent is extended or adjusted under 35 U.S.C. 154(b) by 356 days.

(21) Appl. No.: 18/021,242

(22) PCT Filed: Sep. 1, 2021

(86) PCT No.: PCT/IL2021/051073
§ 371 (c)(1),
(2) Date: Feb. 14, 2023

(87) PCT Pub. No.: WO2022/049577
PCT Pub. Date: Mar. 10, 2022

(65) Prior Publication Data
US 2023/0298306 A1     Sep. 21, 2023

Related U.S. Application Data

(60) Provisional application No. 63/073,544, filed on Sep. 2, 2020.

(51) Int. Cl.
*G06V 10/74* (2022.01)
*G06T 7/00* (2017.01)
(Continued)

(52) U.S. Cl.
CPC ............ *G06V 10/74* (2022.01); *G06T 7/0012* (2013.01); *G06V 10/761* (2022.01);
(Continued)

(58) Field of Classification Search
CPC .... G06V 10/74; G06V 10/759; G06V 10/761; G06V 10/764; G06V 10/765;
(Continued)

(56) References Cited

U.S. PATENT DOCUMENTS 11,017,526 B2 *   5/2021   Angermann ......... G06V 10/776
12,059,125 B2 *   8/2024   Spillinger .......... A61B 1/00016
(Continued)

OTHER PUBLICATIONS

Du, Wenju, et al. "Review on the applications of deep learning in the analysis of gastrointestinal endoscopy images." IEEE Access 7, pp. 142053-142069 (Year: 2019).*

(Continued)

*Primary Examiner* — Scott A Rogers
(74) *Attorney, Agent, or Firm* — Carter, DeLuca & Farrell, LLP

(57) ABSTRACT

The present disclosure relates to systems and methods for determining whether two images of a gastrointestinal tract (GIT) contain the same occurrence of an event indicator or different occurrences of an event indicator. An exemplary processing system includes at least one processor and at least one memory storing instructions. When the instruction are executed by the processor(s), they cause the processing system to access a first image and a second image of a portion of a GIT, where the first image and the second image contain at least one occurrence of an event indicator, and to classify the first image and the second image by a classification system configured to provide an indication of whether the first image and second image contain a same occurrence of the event indicator or contain different occurrences of the event indicator.

15 Claims, 10 Drawing Sheets

(51) Int. Cl.
*G06V 10/764* (2022.01)
*G06V 10/82* (2022.01)

(52) U.S. Cl.
CPC .............. *G06V 10/764* (2022.01); *G06V 10/82* (2022.01); *G06T 2207/10016* (2013.01); *G06T 2207/10068* (2013.01); *G06T 2207/20084* (2013.01); *G06T 2207/30032* (2013.01); *G06V 2201/032* (2022.01)

(58) Field of Classification Search
CPC .............. G06V 10/82; G06V 2201/03; G06V 2201/031; G06V 2201/032; G06T 7/0012; G06T 2207/10016; G06T 2207/10068; G06T 2207/20084; G06T 2207/30004; G06T 2207/30028; G06T 2207/30032; G06T 2207/30096
See application file for complete search history.

(56) References Cited

U.S. PATENT DOCUMENTS

| | | | | |
|---|---|---|---|---|
| 2023/0022030 | A1* | 1/2023 | Kanan | G06V 10/74 |
| 2023/0050833 | A1* | 2/2023 | Cherubini | G06T 7/0012 |
| 2023/0148834 | A1* | 5/2023 | Baras | G06T 7/174 |
| | | | | 382/128 |
| 2023/0320562 | A1* | 10/2023 | Peleg | A61B 1/041 |
| | | | | 600/109 |
| 2023/0397794 | A1* | 12/2023 | Baras | A61B 1/041 |

OTHER PUBLICATIONS

Habe, Tsedeke Temesgen, Keijo Haataja, and Pekka Toivanen "Review of Deep Learning Performance in Wireless Capsule Endoscopy Images for GI Disease Classification." F1000Research 13, p. 201 (Year: 2024).*

Rahim, Tariq, Muhammad Arslan Usman, and Soo Young Shin. "A survey on contemporary computer-aided tumor, polyp, and ulcer detection methods in wireless capsule endoscopy imaging." Computerized Medical Imaging and Graphics 85, p. 101767 (Year: 2020).*

Villard, Benjamin, et al. "Colorectal Polyp Size Classification Using a Siamese Network." (Year: 2019).*

Tavanapong, Wallapak, et al. "Artificial intelligence for colonoscopy: Past, present, and future." IEEE journal of biomedical and health informatics 26(8) pp. 3950-3965 (Year: 2022).*

Villard Benjamin et al, "Colorectal Polyp Size Classification Using a Siamese Network", Proceedings of Machine Learning Research, Apr. 17, 2019 (Apr. 17, 2019).

Brandao P., et al, "Widening Siamese Neural Networks for Stereo Matching in Colonoscopy", Centre for Medical Imaging, University College London, Sep. 14, 2017 (Sep. 14, 2017).

Ghojogh Benyamin, et al, "Fisher Discriminant Triplet and Contrastive Losses for Training Siamese Networks", Department of Electrical and Computer Engineering, University of Waterloo, Waterloo, ON, Canada, Jul. 24, 2020 (Jul. 24, 2020), p. 1-7.

Alaverdyan Z., et al, "Feature extraction with regularized siamese networks for outlier detection: application to lesion screening in medical imaging", arXiv.ORG, Cornell University Library, 201 Online Library Cornell University Ithaca, NY 14853, May 4, 2018 (May 4, 2018).

International Search Report and Written Opinion of the International Searching Authority issued in corresponding application PCT/IL2021/051073 mailed Dec. 7, 2021 (10 pages).

* cited by examiner

SYSTEMS AND METHODS FOR COMPARING DISTANCE BETWEEN EMBEDDING OF IMAGES TO THRESHOLD TO CLASSIFY IMAGES AS CONTAINING THE SAME OR DIFFERENT OCCURRENCE OF EVENT INDICATORS

CROSS-REFERENCE TO RELATED APPLICATIONS

The present application is a U.S. National Stage Application filed under 35 U.S.C. § 371(a) of International Patent Application No. PCT/IL2021/051073, filed Sep. 1, 2021, which claims the benefit of and priority to U.S. Provisional Application No. 63/073,544, filed Sep. 2, 2020, and entitled "Systems and Methods for Comparing Images of Event Indicators." The entire contents of each of the foregoing applications are hereby incorporated by reference herein.

FIELD

The disclosure relates to image analysis of a stream of in-vivo images of a gastrointestinal tract (GIT) and, more particularly, to systems and methods for comparing images of event indicators in a GIT.

BACKGROUND

Capsule endoscopy (CE) allows examining the entire GIT endoscopically. There are capsule endoscopy systems and methods that are aimed at examining a specific portion of the GIT, such as the small bowel (SB) or the colon. CE is a non-invasive procedure which does not require the patient to be admitted to a hospital, and the patient can continue most daily activities while the capsule is in his body.

On a typical CE procedure, the patient is referred to a procedure by a physician. The patient then arrives at a medical facility (e.g., a clinic or a hospital), to perform the procedure. The capsule, which is about the size of a multivitamin, is swallowed by the patient under the supervision of a health professional (e.g., a nurse or a physician) at the medical facility and the patient is provided with a wearable device, e.g., a sensor belt and a recorder placed in a pouch and strap to be placed around the patient's shoulder. The wearable device typically includes a storage device. The patient may be given guidance and/or instructions and then released to his daily activities.

The capsule captures images as it travels naturally through the GIT. Images and additional data (e.g., metadata) are then transmitted to the recorder that is worn by the patient. The capsule is typically disposable and passes naturally with a bowel movement. The procedure data (e.g., the captured images or a portion of them and additional metadata) is stored on the storage device of the wearable device.

The wearable device is typically returned by the patient to the medical facility with the procedure data stored thereon. The procedure data is then downloaded to a computing device typically located at the medical facility, which has an engine software stored thereon. The received procedure data is then processed by the engine to a compiled study (or "study"). Typically, a study includes thousands of images (around 6,000 to 9,000). Typically, the number of images to be processed is of the order of tens of thousands and about 90,000 to 100,000 on average.

A reader (which may be the procedure supervising physician, a dedicated physician or the referring physician) may access the study via a reader application. The reader then reviews the study, evaluates the procedure and provides his input via the reader application. Since the reader needs to review thousands of images, the reading time of a study may usually take between half an hour to an hour on average and the reading task may be tiresome. A report is then generated by the reader application based on the compiled study and the reader's input. On average, it would take an hour to generate a report. The report may include, for example, images of interest, e.g., images which are identified as including pathologies, selected by the reader; evaluation or diagnosis of the patient's medical condition based on the procedure's data (i.e., the study) and/or recommendations for follow up and/or treatment provided by the reader. The report may be then forwarded to the referring physician. The referring physician may decide on a required follow up or treatment based on the report.

While capsule endoscopy is mainly used as a valuable diagnostic tool, other procedures such as colonoscopy or double-balloon enteroscopy may also provide useful information and may be also used for therapeutic purposes. There is continued interest in developing and improving capabilities of capsule endoscopy procedures, colonoscopy procedures, and other GIT evaluation and treatment procedures.

SUMMARY

To the extent consistent, any or all of the aspects detailed herein may be used in conjunction with any or all of the other aspects detailed herein. Aspects of the present disclosure relate to determining whether two images of a gastrointestinal tract (GIT) contain the same occurrence of an event indicator or different occurrences of an event indicator. By identifying images containing the same occurrence of an event indicator or containing different occurrences of an event indicator (e.g., pathology such as a colon polyp), more information can be provided to clinicians for evaluating the images to assess health of the GIT.

In accordance with aspects of the present disclosure, a processing system includes at least one processor and at least one memory storing instructions which, when executed by the at least one processor, cause the processing system to access a first image and a second image of a portion of a gastrointestinal tract (GIT) where the first image and the second image contain at least one occurrence of an event indicator, and to classify the first image and the second image by a classification system configured to provide an indication of whether the first image and second image contain a same occurrence of the event indicator or contain different occurrences of the event indicator.

In various embodiments of the processing system, the first image and the second image are images in a sequence of images, where the first image and the second image are separated in the sequence of images by at least one other image which does not contain an occurrence of the event indicator.

In various embodiments of the processing system, the classification system includes a machine learning system and does not include an image tracker.

In various embodiments of the processing system, the machine learning system is a deep learning neural network configured to provide a first score indicative of the first image and second image containing the same occurrence of the event indicator and to provide a second score indicative of the first image and the second image containing different occurrences of the event indicator.

In various embodiments of the processing system, the first image and the second image are captured during one of: during a same procedure, each during a separate procedure, or each during a different type of procedure. In various embodiments of the processing system, the first image and the second image are captured by the same device or during the same procedure.

In various embodiments of the processing system, the machine learning system is a neural network having an embedding layer configured to provide an embedding, where the neural network is configured to process the first image to provide an embedding of the first image and to process the second image to provide an embedding of the second image. The classification system is further configured to determine a distance between the embedding of the first image and the embedding of the second image and to compare the distance to at least one threshold to classify the first image and second image as containing the same occurrence of the event indicator or as containing different occurrences of the event indicator.

In various embodiments of the processing system, the neural network has a number n of hidden layers, and the embedding layer is located at a layer m among the n hidden layers.

According to some aspects, $$m \geq \frac{n}{2}.$$

In various embodiments of the processing system, the neural network is an autoencoder.

In various embodiments of the processing system, the neural network is trained by triplet loss learning using image triplets that include an anchor image, a positive image, and a negative image. The neural network provides an embedding of the anchor image, an embedding of the positive image, and an embedding of the negative image, and the triplet loss learning trains the neural network so that a distance between the embedding of the anchor image and the embedding of the positive image is decreased and a distance between the embedding of the anchor image and the embedding of the negative image is increased.

In various embodiments of the processing system, the classification system includes a first neural network trained to process an image captured by a first procedure device to provide an embedding, and a second neural network trained to process an image captured by a second procedure device to provide an embedding, where the second procedure device is a different type of device than the first procedure device. The classification system is configured to determine a distance between the embedding provided by the first neural network and the embedding provided by the second neural network, and compare the distance to at least one threshold to classify the image captured by the first procedure device and the image captured by the second procedure device as containing the same occurrence of the event indicator or as containing different occurrences of the event indicator.

In various embodiments of the processing system, the first neural network has a number n of hidden layers, and the embedding from the first neural network is located at a layer m among the n hidden layers. The second neural network has a number k of hidden layers, and the embedding from the second neural network is located at a layer j among the k hidden layers. In some embodiments $$m \geq \frac{n}{2}.$$

In some embodiments $$j \geq \frac{k}{2}.$$

In various embodiments of the processing system, the first neural network is an autoencoder and the second neural network is an autoencoder.

In various embodiments of the processing system, the first procedure device is a capsule endoscopy device and the second procedure device is a device from a group consisting of: a colonoscopy scope and a double-balloon enteroscopy scope.

In various embodiments of the processing system, the classification system includes a consecutive-image tracker.

In various embodiments of the processing system, the first image and the second image are images in a sequence of images, and the first image and the second image are separated in the sequence of images by at least one other image and are not consecutive images in the sequence of images.

In various embodiments of the processing system, the consecutive-image tracker is configured to determine whether an occurrence of an event indicator is tracked between the first image and the second image. The classification system is configured to classify the first image and the second image as containing the same occurrence of the event indicator when the consecutive-image tracker determines that an occurrence of an event indicator is tracked between the first image and the second image, and classify the first image and the second image as containing different occurrences of the event indicator when the consecutive-image tracker determines that an occurrence of an event indicator is not tracked between the first image and the second image.

In various embodiments of the processing system, the event indicator is a focal pathology, the first image and the second image are cropped images containing at least one occurrence of the focal pathology, and the first and second cropped images have the same pixel dimensions and include at least a portion of the focal pathology.

In various embodiments of the processing system, the portion of the focal pathology is centered in the first and second cropped images.

In accordance with aspects of the present disclosure, a computer-implemented method includes accessing a first image and a second image of a portion of a gastrointestinal tract (GIT) captured by a capsule endoscopy device where the first image and the second image contain at least one occurrence of an event indicator, and classifying the first image and the second image by a classification system configured to provide an indication of whether the first image and second image contain a same occurrence of the event indicator or contain different occurrences of the event indicator.

In various embodiments of the computer-implemented method, the classification system includes a machine learning system and does not include an image tracker, the first image and the second image are images in a sequence of images, and the first image and the second image are separated in the sequence of images by at least one other image which does not contain an occurrence of the event indicator.

In various embodiments of the computer-implemented method, the classification system includes a consecutive-image tracker, the first image and the second image are images in a sequence of images, and the first image and the second image are separated in the sequence of images by at least one other image and are not consecutive images in the sequence of images.

In various embodiments of the computer-implemented method, the method includes presenting at least one of the first image or the second image to a user based on the classifying.

In various embodiments of the computer-implemented method, the method includes, in a case the first image and second image contain the same occurrence of the event indicator, presenting only one of the first image or the second image to the user.

In various embodiments of the computer-implemented method, the method includes, in a case the first image and second image contain the same occurrence of the event indicator, and one of the first image and the second image is selected by the user, presenting the other of the first image and the second image to the user as a further image of the same occurrence of the event indicator as the image selected by the user.

BRIEF DESCRIPTION OF DRAWINGS

The above and other aspects and features of the disclosure will become more apparent in view of the following detailed description when taken in conjunction with the accompanying drawings wherein like reference numerals identify similar or identical elements.

DETAILED DESCRIPTION

Figure 1:
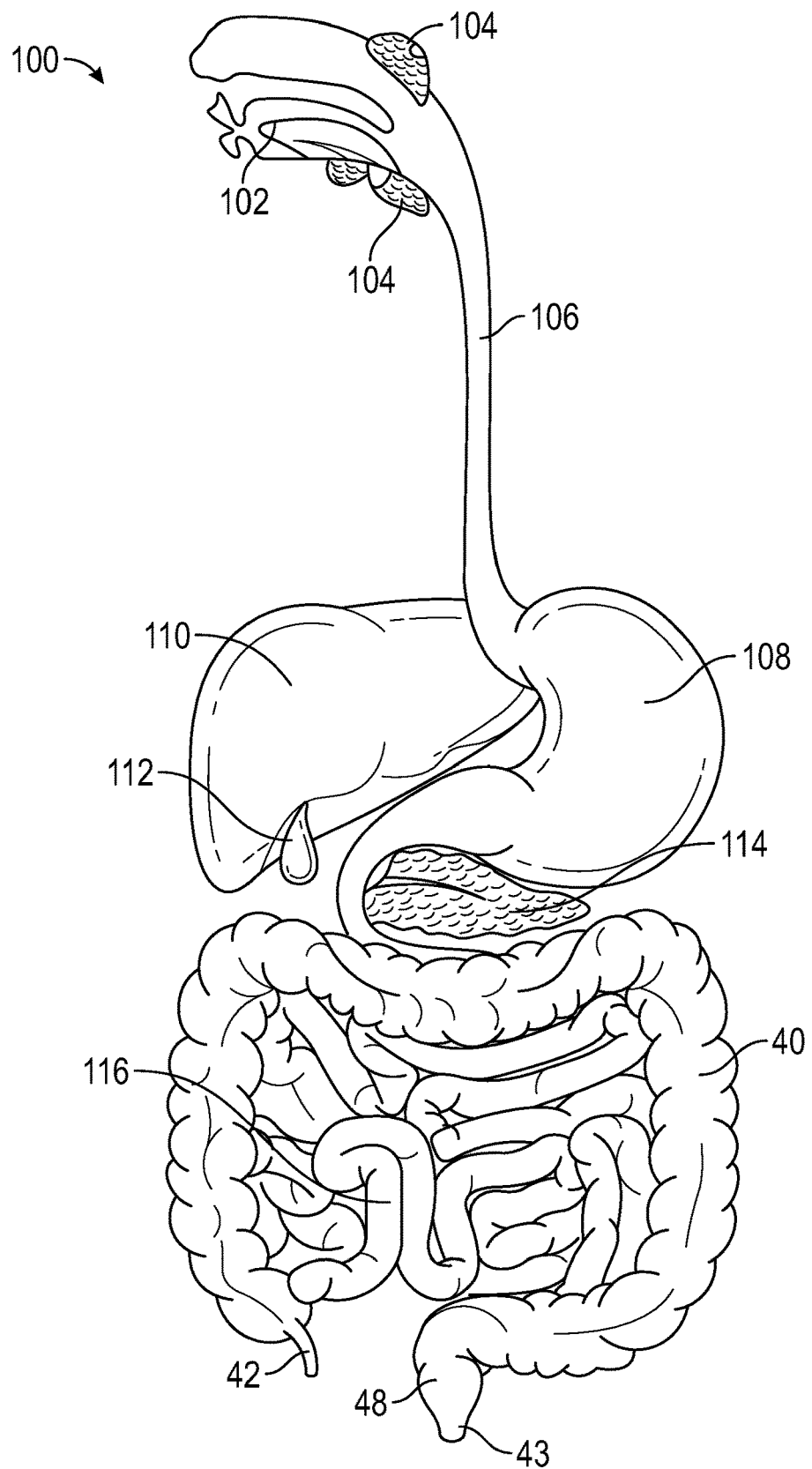
FIG. 1 is a diagram of a gastrointestinal tract (GIT)

The present disclosure relates to systems and methods for comparing images of event indicators in a GIT based on images of a GIT, and more particularly, to determining whether two images of a gastrointestinal tract (GIT) contain the same occurrence of an event indicator or different occurrences of an event indicator. By identifying images containing the same occurrence of an event indicator or containing different occurrences of an event indicator (e.g., pathology such as a colon polyp), more information can be provided to clinicians for evaluating the images to assess health of the GIT. As used herein, the term "event indicator" means and includes an indicator of an event in a GIT, such as an indicator of a pathology, internal bleeding, a foreign body or material, parasites, an indicator of potential cancerous growth (such as a colon polyp), ulcer, lesion, angioectasia, diverticulum, or mass, among other things. Other aspects of the present disclosure apply a tracker to consecutive images. As used herein, the phrase "consecutive images" means and includes images which, when ordered in a sequence, are adjacent to each other in the sequence.

In the following detailed description, specific details are set forth in order to provide a thorough understanding of the disclosure. However, it will be understood by those skilled in the art that the disclosure may be practiced without these specific details. In other instances, well-known methods, procedures, and components have not been described in detail so as not to obscure the present disclosure. Some features or elements described with respect to one system may be combined with features or elements described with respect to other systems. For the sake of clarity, discussion of same or similar features or elements may not be repeated.

Although the disclosure is not limited in this regard, discussions utilizing terms such as, for example, "processing," "computing," "calculating," "determining," "establishing," "analyzing," "checking," or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although the disclosure is not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items. Unless explicitly stated, the methods described herein are not constrained to a particular order or sequence. Additionally, some of the described methods or elements thereof can occur or be performed simultaneously, at the same point in time, or concurrently.

A type of CE procedure may be determined based on, inter alia, the portion of the GIT that is of interest and is to be imaged (e.g., the colon or the small bowel ("SB")), or based on the specific use (e.g., for checking the status of a GI disease, such as Crohn's disease, or for colon cancer screening).

The terms screen(s), view(s) and display(s) may be used herein interchangeably and may be understood according to the specific context.

The term "adjacent" as referred to herein with respect to images (e.g., images that are adjacent to other image(s)), may relate to spatial and/or temporal characteristics unless specifically indicated otherwise. For example, images that are adjacent to other image(s) may be images of GIT portions that are estimated to be located near GIT portions captured in the other image(s) along the GIT and/or images that were captured near the capture time of another image, within a certain threshold, e.g., within one or two centimeters, or within one, five, or ten seconds.

The terms "GIT" and "a portion of the GIT" may each refer to or include the other, according to their context. Thus, the term "a portion of the GIT" may also refer to the entire GIT and the term "GIT" may also refer only to a portion of the GIT.

The terms "image" and "frame" may each refer to or include the other and may be used interchangeably in the present disclosure to refer to a single capture by an imaging device. For convenience, the term "image" may be used more frequently in the present disclosure, but it will be understood that references to an image shall apply to a frame as well.

The term "classification score" or "score" may be used to describe a value or a vector of values for a category or a set of categories applicable to an image/frame. The term "classification probabilities" or "probabilities" may be used to describe a transformation of classification scores into values which reflect probabilities that each category of the set of categories applies to the image/frame. The model providing a classification score or probability may be a machine learning system or may be a non-machine learning system.

A "classification system" may be any system that operates to classify two images as containing the same instance or occurrence of an event indicator or as containing different instances or occurrences of the event indicator. A classification system may be/include a machine-learning system or may not be/include a machine learning system. A classification system may provide/involve a classification score/probability (e.g., by applying a classification model) or may not provide/involve a classification score/probability.

Referring to FIG. 1, an illustration of the GIT 100 is shown. The GIT 100 is an organ system within humans and other animals. The GIT 100 generally includes a mouth 102 for taking in sustenance, salivary glands 104 for producing saliva, an esophagus 106 through which food passes aided by contractions, a stomach 108 to secret enzymes and stomach acid to aid in digesting food, a liver 110, a gall bladder 112, a pancreas 114, a small intestine/small bowel 116 ("SB") for the absorption of nutrients, and a colon 40 (e.g., large intestine) for storing water and waste material as feces prior to defecation. The colon 40 generally includes an appendix 42, a rectum 48, and an anus 43. Food taken in through the mouth is digested by the GIT to take in nutrients and the remaining waste is expelled as feces through the anus 43.

Studies of different portions of the GIT 100 (e.g., colon 40, esophagus 106, and/or stomach 108) may be presented via a suitable user interface. As used herein, the term "study" refers to and includes at least a set of images selected from the images captured by a CE imaging device (e.g., 212, FIG. 2) during a single CE procedure performed with respect to a specific patient and at a specific time, and can optionally include information other than images as well. The type of procedure performed may determine which portion of the GIT 100 is the portion of interest. Examples of types of procedures performed include, without limitation, a small bowel procedure, a colon procedure, a small bowel and colon procedure, a procedure aimed to specifically exhibit or check the small bowel, a procedure aimed to specifically exhibit or check the colon, a procedure aimed to specifically exhibit or check the colon and the small bowel, or a procedure to exhibit or check the entire GIT: esophagus, stomach, SB and colon.

Figure 2:
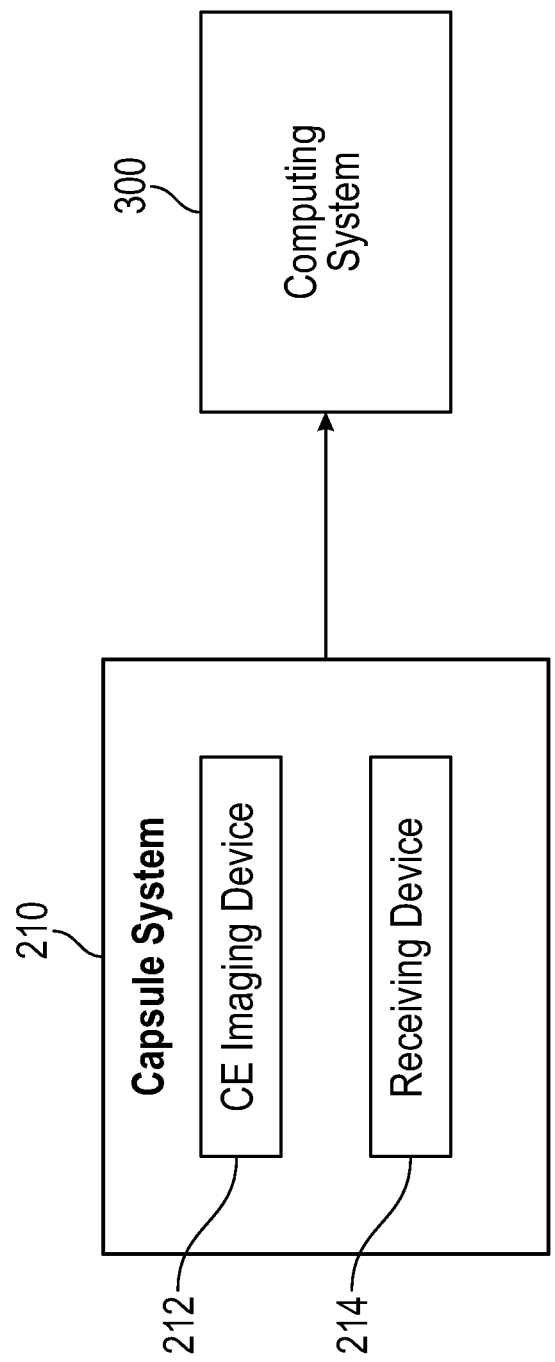
FIG. 2 is a block diagram of an exemplary system for analyzing medical images captured in vivo via a Capsule Endoscopy (CE) procedure, in accordance with aspects of the disclosure.

FIG. 2 shows a block diagram of a system for analyzing medical images captured in vivo via a CE procedure. The system generally includes a capsule system 210 configured to capture images of the GIT and a computing system 300 (e.g., local system and/or cloud system) configured to process the captured images.

The capsule system 210 may include a swallowable CE imaging device 212 (e.g., a capsule) configured to capture images of the GIT as the CE imaging device 212 travels through the GIT. The images may be stored on the CE imaging device 212 and/or transmitted to a receiving device 214 typically including an antenna. In some capsule systems 210, the receiving device 214 may be located on the patient who swallowed the CE imaging device 212 and may, for example, take the form of a belt worn by the patient or a patch secured to the patient.

The capsule system 210 may be communicatively coupled with the computing system 300 and can communicate captured images to the computing system 300. The computing system 300 may process the received images using image processing technologies, machine learning technologies, and/or signal processing technologies, among other technologies. The computing system 300 can include local computing devices that are local to the patient and/or the patient's treatment facility, a cloud computing platform that is provided by cloud services, or a combination of local computing devices and a cloud computing platform.

In the case where the computing system 300 includes a cloud computing platform, the images captured by the capsule system 210 may be transmitted online to the cloud computing platform. In various embodiments, the images can be transmitted via the receiving device 214 worn or carried by the patient. In various embodiments, the images can be transmitted via the patient's smartphone or via any other device connected to the Internet and which may be coupled with the CE imaging device 212 or the receiving device 214.

Figure 3:
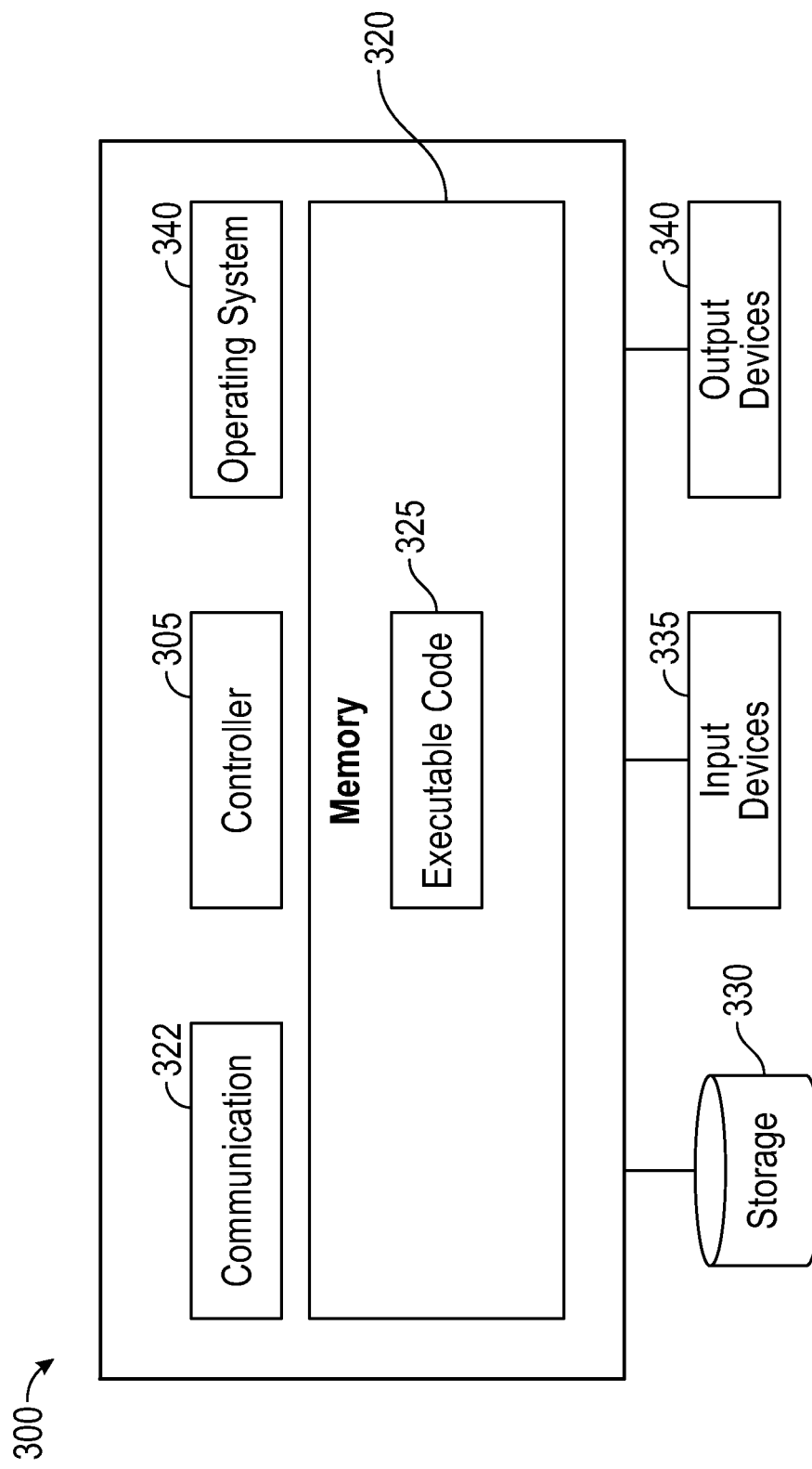
FIG. 3 is a block diagram of an exemplary computing system which may be used with the systems of the disclosure.

FIG. 3 shows a high-level block diagram of an exemplary computing system 300 that may be used with image analyzing systems of the present disclosure. Computing system 300 may include a processor or controller 305 that may be or include, for example, one or more central processing unit processor(s) (CPU), one or more Graphics Processing Unit(s) (GPU or GPGPU), a chip or any suitable computing or computational device, an operating system 215, a memory 320, a storage 330, input devices 335 and output devices 340. Modules or equipment for collecting or receiving (e.g., a receiver worn on a patient) or displaying or selecting for display (e.g., a workstation) medical images collected by the CE imaging device 212 (FIG. 2) may be or include, or may be executed by, the computing system 300 shown in FIG. 3. A communication component 322 of the computing system 300 may allow communications with remote or external devices, e.g., via the Internet or another network, via radio, or via a suitable network protocol such as File Transfer Protocol (FTP), etc.

The computing system 300 includes an operating system 315 that may be or may include any code segment designed and/or configured to perform tasks involving coordination, scheduling, arbitration, supervising, controlling or otherwise managing operation of computing system 300, for example, scheduling execution of programs. Memory 320 may be or may include, for example, a Random Access Memory (RAM), a read-only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 320 may be or may include a plurality of, possibly different memory units. Memory 320 may store for example, instructions to carry out a method (e.g., executable code 325), and/or data such as user responses, interruptions, etc.

Executable code 325 may be any executable code, e.g., an application, a program, a process, task or script. Executable code 325 may be executed by controller 305 possibly under control of operating system 315. For example, execution of executable code 325 may cause the display or selection for display of medical images as described herein. In some systems, more than one computing system 300 or components of computing system 300 may be used for multiple functions described herein. For the various modules and functions described herein, one or more computing systems 300 or components of computing system 300 may be used. Devices that include components similar or different to those included in the computing system 300 may be used, and may be connected to a network and used as a system. One or more processor(s) 305 may be configured to carry out methods of the present disclosure by for example executing software or code. Storage 330 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, medical images, image streams, etc. may be stored in storage 330 and may be loaded from storage 330 into memory 320 where it may be processed by controller 305. In some embodiments, some of the components shown in FIG. 3 may be omitted.

Input devices 335 may include for example a mouse, a keyboard, a touch screen or pad or any suitable input device. It will be recognized that any suitable number of input devices may be operatively coupled to computing system 300. Output devices 340 may include one or more monitors, screens, displays, speakers and/or any other suitable output devices. It will be recognized that any suitable number of output devices may be operatively coupled to computing system 300 as shown by block 340. Any applicable input/output (I/O) devices may be operatively coupled to computing system 300, for example, a wired or wireless network interface card (NIC), a modem, printer or facsimile machine, a universal serial bus (USB) device or external hard drive may be included in input devices 335 and/or output devices 340.

Multiple computer systems 300 including some or all of the components shown in FIG. 3 may be used with the described systems and methods. For example, a CE imaging device 212, a receiver, a cloud-based system, and/or a workstation or portable computing device for displaying images may include some or all of the components of the computer system of FIG. 3. A cloud platform (e.g., a remote server) including components such as computing system 300 of FIG. 3 may receive procedure data such as images and metadata, processes and generate a study, and may also display the generated study for the doctor's review (e.g., on a web browser executed on a workstation or portable computer). An "on-premise" option, may use a workstation or local server of a medical facility to store, process and display images and/or a study.

According to some aspects of the present disclosure, a user (e.g., a physician), may build his or her understanding of a case by reviewing a study, e.g., a display of images (e.g., captured by the CE imaging device 212) that were selected, e.g., automatically, as images that may be of interest. In some systems of the present disclosure, a relatively small number of images from the captured images are displayed for the user's review per case. By "relatively small number" it is meant on the order of hundreds at most or at least at average as opposed to current methods, which display a video stream of images that typically includes thousands of images per a case (e.g., around 6,000 to 9,000 images). In some systems, only up to a few hundreds of images are displayed for the user's review. In some systems, the number of images displayed for the user's review is up to an order of 1,000. Browsing through a relatively small number of images, as opposed to watching or reviewing thousands of images, may significantly ease the review process for the user, reduce the reading time per case and may lead to better diagnosis. Aspects of exemplary user interfaces for displaying such a study are described in co-pending International Patent Application Publication No. WO/2020/079696, entitled "Systems and Methods for Generating and Displaying a Study of a Stream of In-Vivo Images," which is hereby incorporated by reference in its entirety. Other aspects of the computing system 300 and the capsule system (210, FIG. 2) are described in co-pending International Application No. PCT/US2020/033341, entitled "Systems and Methods For Capsule Endoscopy Procedure," which is hereby incorporated by reference in its entirety. Generally, the disclosed technology may be utilized by the systems and methods of the co-pending applications and/or by any other capsule endoscopy systems or methods, such as PillCam™ capsule endoscopy systems (e.g., SB 3, colon 2, or Crohn's PillCam™ systems). The disclosed technology may be also utilized by other GIT imaging technologies, modalities or procedures, such as colonoscopy or double-balloon enteroscopy.

The following description relates to images captured by a capsule endoscopy device. Such images may be part of a stream of images of the GIT and may be picked out or selected from the stream of GIT images. Colon images may be used merely as an example of the aspects and embodiments described below. The embodiments and aspects described herein also apply to other portions of a GIT, and it is intended that any description related to colon images shall be applicable to images of other portions of a GIT. Additionally, the present disclosure can be applied to images captured by other devices and other procedures, such as images captured by a colonoscopy scope in a colonoscopy procedure. Unless otherwise stated, aspects and embodiments of the present disclosure relating to capsule endoscopy images are also applicable to colonoscopy or double-balloon enteroscopy images and to images of the GIT generally.

In various embodiments, the first and second images of the GIT (412, 414, FIG. 4) according to the present disclosure may be captured during a specific GIT procedure or during the same procedure. In various embodiments, the first image may be captured during a first procedure while the second image may be captured during a second procedure, i.e., each during a separate procedure. In various embodiments, the first procedure and the second procedure may be the same type of procedure, e.g., a CE procedure. In various embodiments, the first procedure and the second procedure may be different types of GIT procedures, i.e., each of the two images may be captured during a different type of procedure. For example, a first image may be captured during a CE procedure and a second image may be captured during a subsequent colonoscopy procedure. In another example, a first image may be captured during a CE procedure and a second image may be captured during a subsequent double-balloon procedure.

Figure 4:
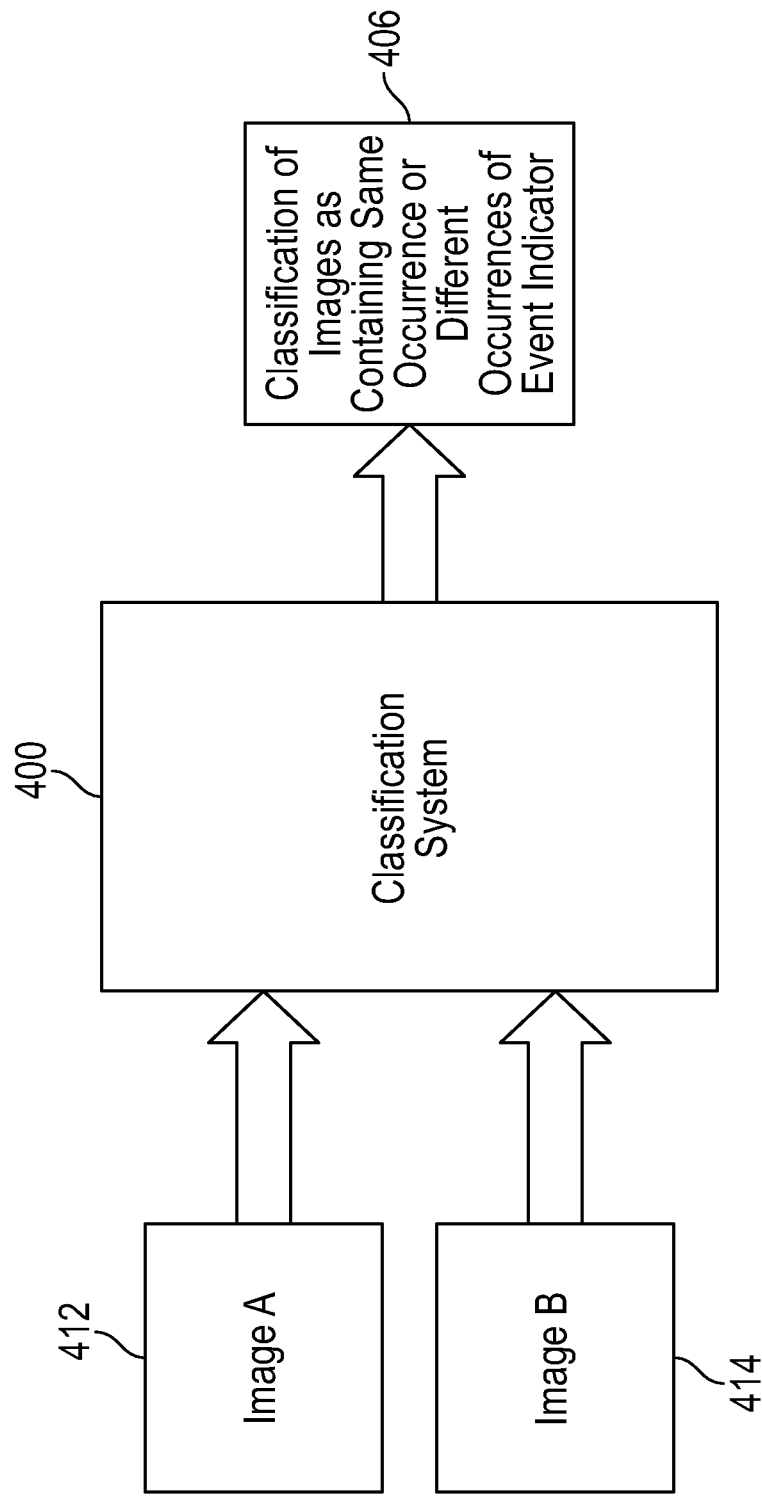
FIG. 4 is a block diagram of an exemplary classification system, in accordance with aspects of the disclosure.

In accordance with aspects of the present disclosure, and with reference to FIG. 4, a block diagram for a classification system 400 is shown. The classification system 400 processes two input images 412, 414 and classifies them as containing the same occurrence of an event indicator or as containing different occurrences of the event indicator 406. The input images 412, may be images in a sequence of images which may be separated by other images and which may not be consecutive images. Additionally, the input images may contain one or more occurrences of an event indicator, while one or more of the other images between the input images may not include any occurrences of the event indicator. In various embodiments, the input images 412, 414 can be cropped from a larger image and the cropped images can contain at least a portion of an event indicator (e.g., focal pathology). The cropped images can have the same pixel dimensions, and the event indicator (e.g., focal pathology) can be centered in the cropped images. In various embodiments, the images 412, 414 may be, for example, colon images captured by a CE imaging device (e.g., 212, FIG. 2). The classification system 400 may be used to classify colon images 412, 414 as containing the same occurrence of, e.g., a colon polyp or classify the pair of images as containing different occurrences of colon polyps 406. In various embodiments, the images 412, 414 may be images of one or more portions of a GIT other than the colon.

As mentioned above, the classification system may be any system that operates to classify two images as containing the same occurrence of an event indicator or as containing different instances of the event indicator. In various embodiments, the classification system may include a machine learning system, which may be any machine which applies machine learning techniques, such as classical machine learning techniques (e.g., support vector machine, decision tree, etc.), neural networks, or deep learning neural networks, among others. As persons skilled in the art will understand, a deep learning neural network is a neural network having several hidden layers and which does not require feature selection or feature engineering. A "classical" machine learning system, in contrast, is a machine learning system which requires feature selection or feature engineering.

In various embodiments, the input images 412, 414 to the classification system 400 can be captured by a single device in a single procedure, such as a single capsule endoscopy device used in a specific capsule endoscopy procedure, or a single scope in a colonoscopy procedure, among other possibilities. In various embodiments, the input images 412, 414 to the classification system 400 can be captured by separate procedure devices or captured from separate procedures. Separate devices may be different types of devices or the same type of device but not the same device. Separate procedures may be different types of procedures or the same type of procedure but performed at different times. For example, one input image may be an image of a focal pathology (e.g., polyp) captured by capsule endoscope, while the other input image may be an image of the focal pathology (e.g., polyp) captured by a colonoscopy scope or a double-balloon scope. As another example, one image may be captured via a CE procedure performed at a certain time while the other image was captured via a CE procedure performed at a different time. The classification system 400 can operate to determine whether the images captured by separate devices or by separate procedures contain the same occurrence of an event indicator or contain different occurrences of the event indicator. In this way, images captured by separate devices or procedures may be matched to each other to provide a clinician with more information which may assist the clinician or physician, e.g., in making diagnostic or therapeutic decisions. For example, comparing images from different imaging modalities may be useful when the second modality may be used for therapeutic intervention (e.g., colonoscopy or double-balloon enteroscopy). During the second procedure, a comparison may be performed in real-time to identify whether the event indicator (e.g., polyp) which is viewed or just viewed by the system is the same as an event indicator (e.g., a polyp or a specific one of several polyps) which was identified by the CE procedure. If the event indicator viewed in the second procedure is a different occurrence than the event indicators identified by the CE procedure, for example, the surgeon can be informed that she would still need to find and remove the CE identified polyp.

Various implementations of the classification system 400 will be described below. An implementation using a neural network in the classification system 400 is described in connection with FIG. 5. An implementation using a neural network embedding in the classification system 400 will be described in connection with FIGS. 6 and 7. An implementation using an image tracker in the classification system 400 will be described in connection with FIGS. 8-10.

Figure 5:
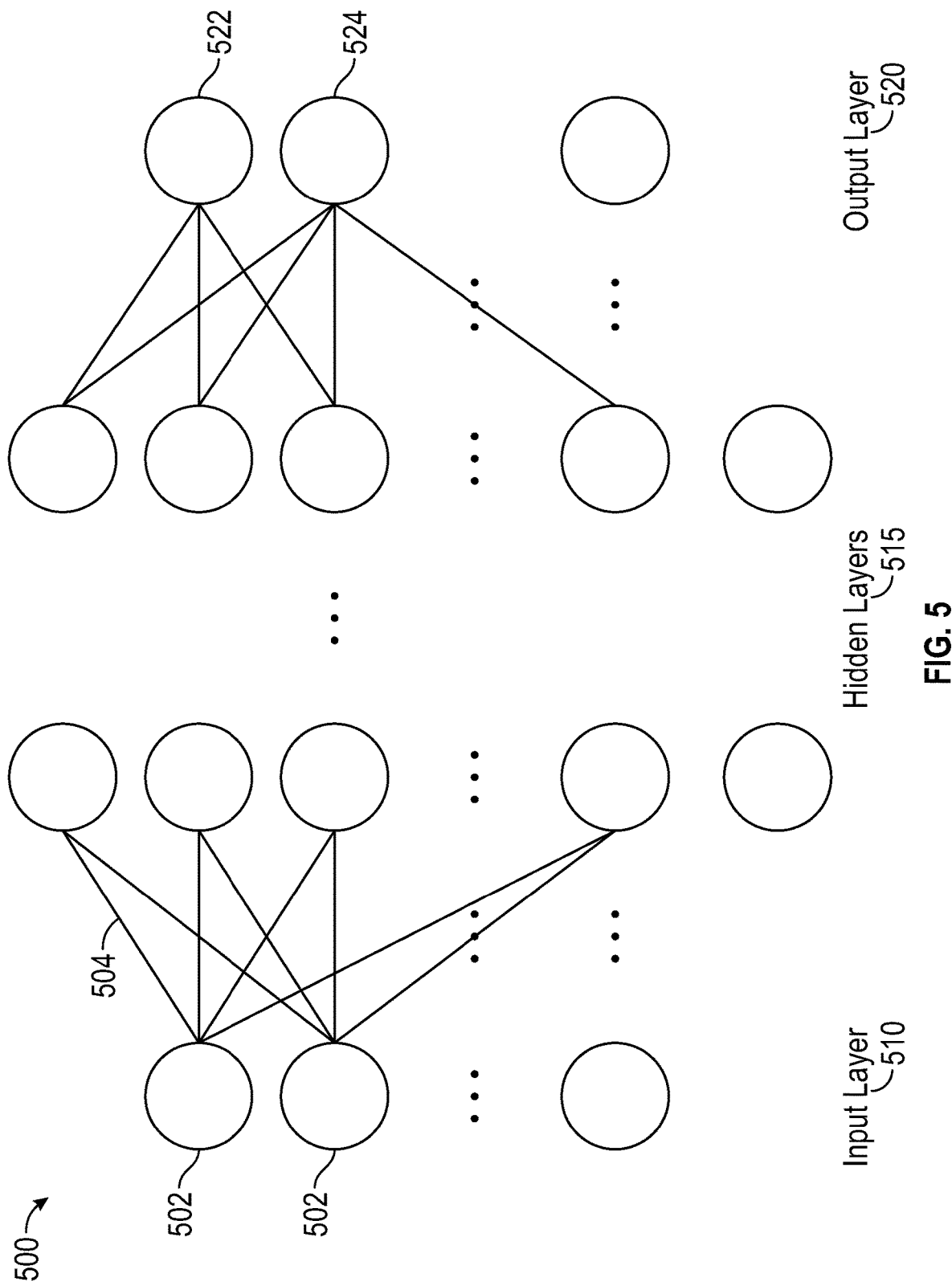
FIG. 5 is a diagram of an exemplary neural network, in accordance with aspects of the present disclosure.

Referring to FIG. 5, a diagram of an exemplary neural network 500 is shown, which can be a deep learning neural network or a convolutional neural network, among other types of neural networks. The neural network 500 includes at least one input layer 510, one or more hidden layers 515, and at least one output layer 520. The neural network 500 includes neurons/nodes 502. As persons skilled in the art will understand, each neuron 502 includes a value and the neuron values of a subsequent layer are based on a weighted combination 504 of certain neuron values of a preceding layer. Learning in the neural network progresses by making iterative adjustments to the weights. The neural network 500 may be trained based on labeled training images. Persons skilled in the art will understand training of the neural network 500 and how to implement the neural network and training of a neural network. The configuration of FIG. 5 is exemplary and variations are contemplated to be within the scope of the present disclosure. For example, in various embodiments, the neural network 500 may receive additional input directly to hidden layers and/or may provide additional output from hidden layers, as persons skilled in the art will recognize. Such and other variations are contemplated to be within the scope of the present disclosure.

In some systems, the neural network 500 may be a deep learning neural network. In various embodiments, a deep learning neural network includes multiple hidden layers 515 and may process input images to output scores or probabilities. As described above herein, the term "classification score" or "score" may be used to describe a value or a vector of values for a category or a set of categories applicable to an image/frame. The term "classification probabilities" or "probabilities" may be used to describe a transformation of classification scores into values which reflect probabilities that each category of the set of categories applies to the image/frame.

In the illustrated embodiment, the neural network 500 can receive a pair of input images (412, 414, FIG. 4) at an input layer 510, process the input images in the hidden layers 515, and output two classification scores or probabilities 522, 524 at an output layer 520. A first classification score/probability 522 indicates whether the pair of input images contain the same occurrence of an event indicator, and a second classification score/probability 524 indicates whether the pair of input images contain different occurrences of an event indicator, such as a colon polyp or an ulcer. The classification scores/probabilities 522, 524 can then be used to classify the input images as containing the same occurrence of an event indicator or as containing different occurrences of an event indicator (406, FIG. 4). Persons skilled in the art will understand deep learning neural networks and how to implement them. Various deep learning neural networks can be used, including, without limitation, MobileNet or Inception.

With continuing reference to FIG. 5, the neural network 500 may be a convolutional neural network (CNN), which is a class of neural networks that is most commonly applied to analyze images. As persons skilled in the art will understand, the convolutional aspect of a CNN relates to applying matrix processing operations to localized portions of an image. A CNN typically includes convolution layers, activation function layers, and pooling (typically max pooling) layers to reduce dimensionality without losing too much information. Persons skilled in the art will understand how to implement convolutional neural networks.

The neural network 500 may be trained using supervised learning based on labeled training images. For example, pairs of input images 412, 414 (FIG. 4) may have a label indicating whether they contain the same occurrence of an event indicator or different occurrences of an event indicator, such as the same occurrence of a colon polyp or different occurrences of colon polyps, among others things. The training further may include augmenting the training images by adding noise, changing colors, hiding portions of the training images, scaling of the training images, rotating the training images, and/or stretching the training images. In various embodiments, training images that contain an occurrence of an event indicator (e.g., focal pathology) can be cropped, and the cropped images can contain at least a portion of the focal pathology. In various embodiments, the cropped images can have the same pixel dimensions, and the focal pathology can be centered in the cropped images. Persons skilled in the art will understand training a neural network and how to implement the training.

The illustrated embodiment of FIG. 5 and the embodiments described above are exemplary and variations are contemplated to be within the scope of the present disclosure. For example, in various embodiments, unsupervised learning (e.g., clustering) or another type of learning may be used. In various embodiments, the classification system 400 can be implemented by various configurations of deep learning neural networks, by machine learning systems that are not deep learning neural networks, by neural networks which do not provide a classification score or probability (e.g., FIG. 6 described below), and/or by any other techniques which determine which category or set of categories is applicable to an input, which persons skilled in the art will recognize. In various embodiments, the input images to the neural network can be captured by separate procedure devices or by separate procedures. For example, one input image may be captured by capsule endoscopy, while the other input image may be captured by a colonoscopy scope. The neural network 500 can operate to determine whether the images captured by separate devices or separate procedures contain the same occurrence of an event indicator or contain different occurrences of the event indicator. In this way, images captured by separate devices or separate procedures may be matched to each other to provide a clinician with more information about a GIT. For example, comparing images from different imaging modalities may be useful when the second modality may be used for therapeutic intervention (e.g., colonoscopy or double-balloon enteroscopy). During the second procedure, a comparison may be performed in real-time to identify whether the event indicator (e.g., polyp) which is viewed or just viewed by the system is the same as an event indicator (e.g., a polyp or a specific one of several polyps) which was identified by the CE procedure. If the event indicator viewed in the second procedure is a different occurrence than the event indicators identified by the CE procedure, for example, the surgeon can be informed that she would still need to find and remove the CE identified polyp. Such variations are contemplated to be within the scope of the present disclosure.

Figure 6:
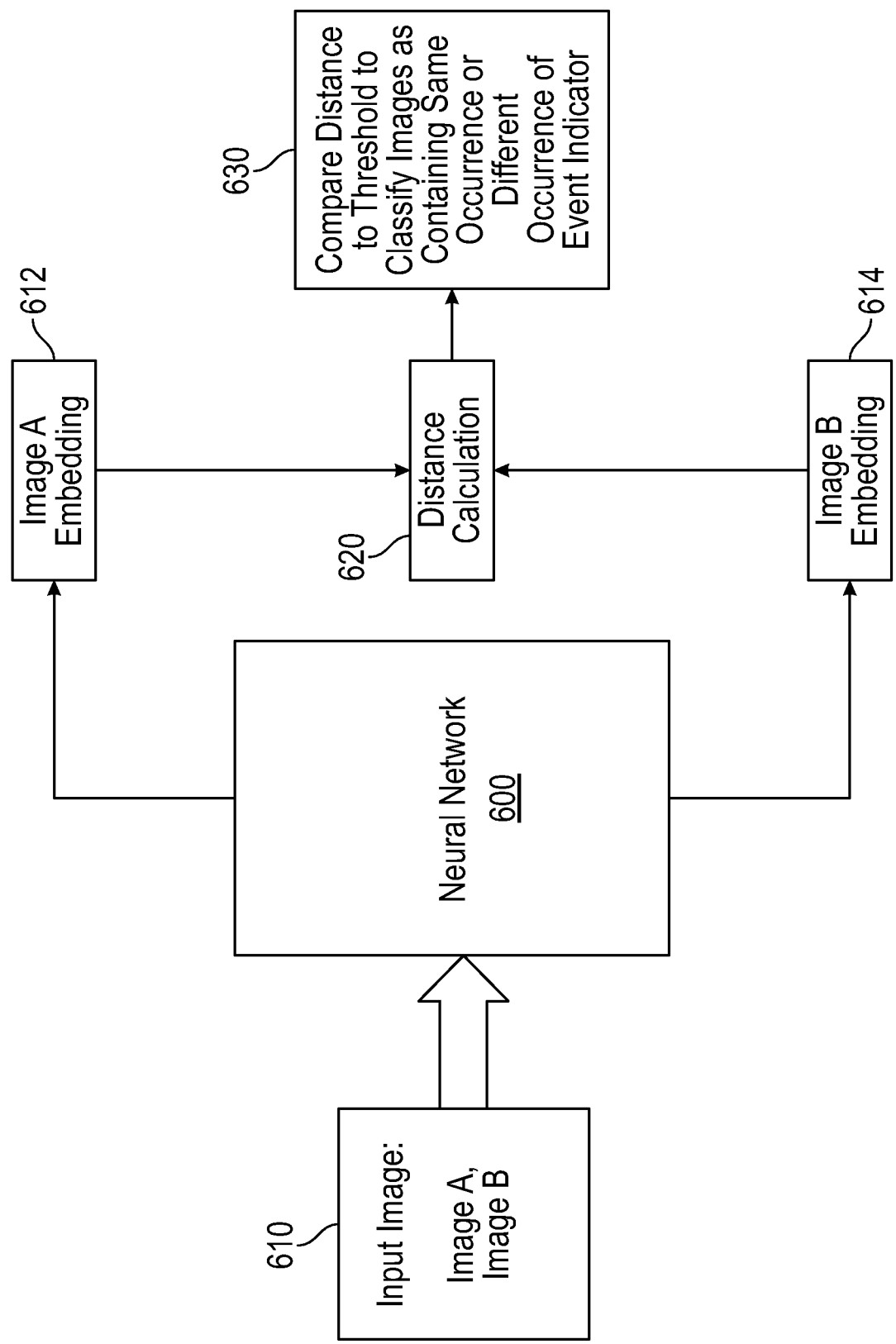
FIG. 6 is a block diagram of an exemplary classification system using a neural network embedding, in accordance with aspects of the present disclosure.

Referring now to FIG. 6, and in accordance with aspects of the present disclosure, there is shown a block diagram of an exemplary classification system (400, FIG. 4) that uses neural network embeddings. A neural network embedding refers to node values of a hidden layer of a neural network 600 that can represent certain characteristics of an input image 610. Such a hidden layer is referred to as an embedding layer, which typically is configured to have lower dimensionality than the dimensionality of the input to the neural network 600, thereby using less data than the original input to represent a particular characteristic of the input. The nodes of the embedding layer provide a vector of values that is referred to as the embedding. Generally, an embedding can be taken from any hidden layer of the neural network 600, but earlier hidden layers may be less likely to provide meaningful representations of characteristics than later hidden layers. In various embodiments, if the neural network 600 includes a number n of hidden layers, the embedding layer can be a layer m among the n hidden layers. In various embodiments m can be such that $m \geq n/2$. In various embodiments, the neural network 600 can be a deep learning neural network or a convolutional neural network or another type of neural network. In various embodiments, the neural network 600 can be an autoencoder. In various embodiments, the embedding can be taken from a fully connected layer of the neural network 600 or from another hidden layer that is not a fully connected layer.

With continuing reference to FIG. 6, the illustrated neural network 600 is configured to process one input image 610 at a time, such as either image A or image B (412, 414, FIG. 4). As mentioned above, image A and image B may be images in a sequence of images and may be separated by other images and may not be consecutive images. Additionally, image A and image B may contain one or more occurrences of an event indicator, while one or more or all of the other images between image A and image B may not include any occurrences of the event indicator. In various embodiments, the input images 610 can be cropped from larger images and the cropped images can contain at least a portion of an event indicator (e.g., focal pathology). The cropped images can have the same pixel dimensions, and the event indicator (e.g., focal pathology) can be centered in the cropped images. Such cropped images may be beneficial when they eliminate extraneous information in the larger images from which they are cropped. Persons skilled in the art will recognize various techniques for centering and cropping the area of interest in the larger image based on given or generated masks.

When the neural network 600 processes image A as the input image 610, an embedding 612 representing a characteristic of image A can be extracted from the neural network 600. When the neural network 600 processes image B as the input image 610, an embedding 614 representing a characteristic of image B can be extracted from the neural network 600. The embeddings for image A and image B 612, 614 can be compared to determine how similar or different they are. In FIG. 6, the comparison is performed by a distance calculation 620, which can be a Euclidean distance, a cosine distance, or a L1 distance, among others. Other types of distances or metrics are contemplated for the distance calculation 620.

The computed distance between the image A embedding 612 and the image B embedding 614 can be compared to a threshold 630 to determine whether image A and image B contain the same occurrence of an event indicator or contain different occurrences of an event indicator. For example, a distance between the embeddings that is less than or equal to the threshold indicates that certain characteristics of image A and image B may be very similar, which can result in a determination that image A and image B contain the same occurrence of an event indicator. On the other hand, a distance between the embeddings that is greater than the threshold indicates that certain characteristics of the image A and image B may be very different, which can result in a determination that image A and image B contain different occurrences of an event indicator.

As there is a choice of different embeddings in a neural network 600, the embedding can be chosen to reflect characteristics of the event indicator. For example, if the event indicator is a colon polyp in an image of the colon, an embedding that reflects characteristics of the polyp in the image can be chosen. Additionally, the threshold value can be chosen to be effective at distinguishing embeddings which are similar enough to indicate the same occurrence of a polyp, with embedding which are not similar enough to indicate different occurrences of polyps. In other embodiments, the threshold value can be chosen to be effective at distinguishing embeddings which are different enough to indicate different occurrences of polyps, with embedding which are not different enough to indicate different occurrences of polyps. In various embodiments, more than one threshold value can be used. For example, embedding distances above an upper threshold can indicate different occurrences of the event indicator, whereas embedding distances below a lower threshold can indicate the same occurrence of the event indicator. In various embodiments, more than two threshold values can be used.

The embodiment of FIG. 6 is exemplary and variations are contemplated to be within the scope of the present disclosure. For example, in various embodiments, the neural network 600 can be replicated to provide a second instance of the neural network 600. In such an embodiment (not shown), two duplicate instances of the neural network 600 can operate to process image A and image B in parallel to provide faster processing.

In another variation, two separate neural networks (not shown) can be trained, where the first neural network is trained on images captured by one type of procedure device or procedure (e.g., capsule endoscopy) while the second neural network is trained on images captured by another type of procedure device or procedure (e.g., colonoscopy scope). For example, the first neural network can operate to provide embeddings of capsule endoscopy images, and the second neural network can operate to provide embeddings of colonoscopy images. The embedding can be compared to determine whether the images captured by different types of devices or different procedures contain the same occurrence of an event indicator or contain different occurrences of the event indicator. In this way, images captured by different devices may be matched to each other to provide a clinician with more information about a GIT. For example, comparing images from different imaging modalities may be useful when the second modality may be used for therapeutic intervention (e.g., colonoscopy or double-balloon enteroscopy). During the second procedure, a comparison may be performed in real-time to identify whether the event indicator (e.g., polyp) which is viewed or just viewed by the system is the same as an event indicator (e.g., a polyp or a specific one of several polyps) which was identified by the CE procedure. If the event indicator viewed in the second procedure is a different occurrence than the event indicators identified by the CE procedure, for example, the surgeon can be informed that she would still need to find and remove the CE identified polyp. The first neural network and the second neural network may be autoencoders. The embedding layer in the first neural network may be located at a layer m among n hidden layers. In various embodiments $$m \geq \frac{n}{2}.$$

The embedding layer in the second neural network may be a layer located at a layer j among k hidden layers. In various embodiments $$j \geq \frac{k}{2}.$$

Other variations are contemplated to be within the scope of the present disclosure.

Figure 7:
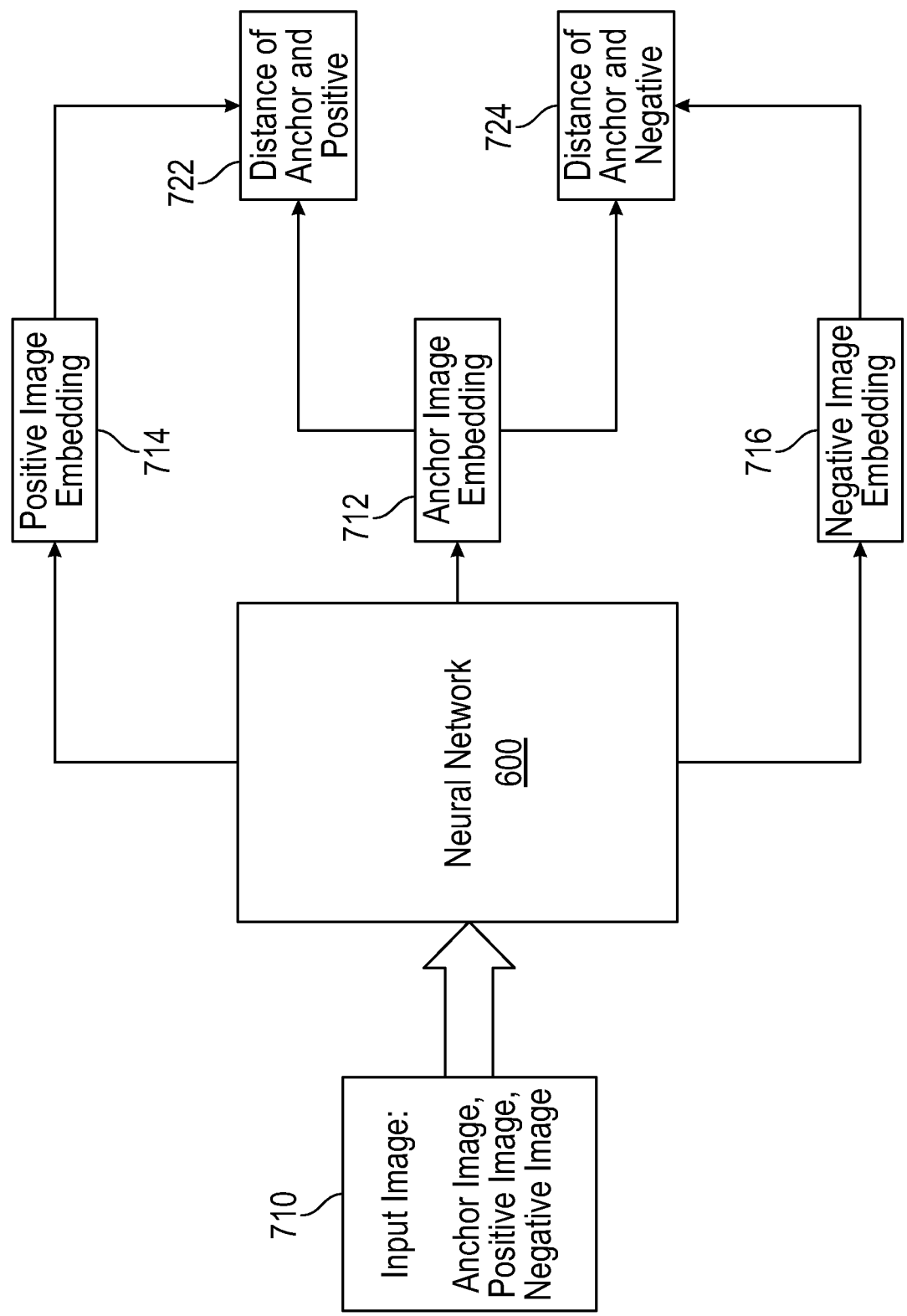
FIG. 7 is a block diagram of an exemplary approach to training the classification system of FIG. 6 using triplet loss learning, in accordance with aspects of the present disclosure.

Referring now to FIG. 7, there is shown a block diagram for training the neural network 600 of FIG. 6. The illustrated training approach will be recognized by persons skilled in the art as triplet-loss learning. Image triplets 710 are input to the neural network 600 for training, including an anchor image, a positive image, and a negative image. In accordance with aspects of the present disclosure, each image triplet is configured such that the anchor image and the positive image are known to contain the same occurrence of an event indicator, and the negative image is known to contain a different occurrence of the event indicator from the anchor image. The anchor image, the positive image, and the negative image are processed by the neural network one at a time to provide an anchor image embedding 712, a positive image embedding 714, and a negative image embedding 716, respectively. A distance 722 is computed for the distance between the anchor image embedding 712 and the positive image embedding 714, and another distance 724 is computed for the distance between the anchor image embedding and the negative image embedding. The distances can be a computed as a Euclidean distance or as another distance metric. The training operates to adjust weights in the neural network 600 to decrease the distance 722 between anchor image embeddings and positive image embeddings, and to increase the distance 724 between anchor image embeddings and negative image embeddings. Once the neural network 600 is trained by this triplet-loss approach, embeddings between images having the same occurrence of an event indicator should be more similar, whereas embeddings between images having different occurrences of the event indicator should be more disparate. The trained neural network 600 is then used in the manner described in connection with FIG. 6.

Figure 8:
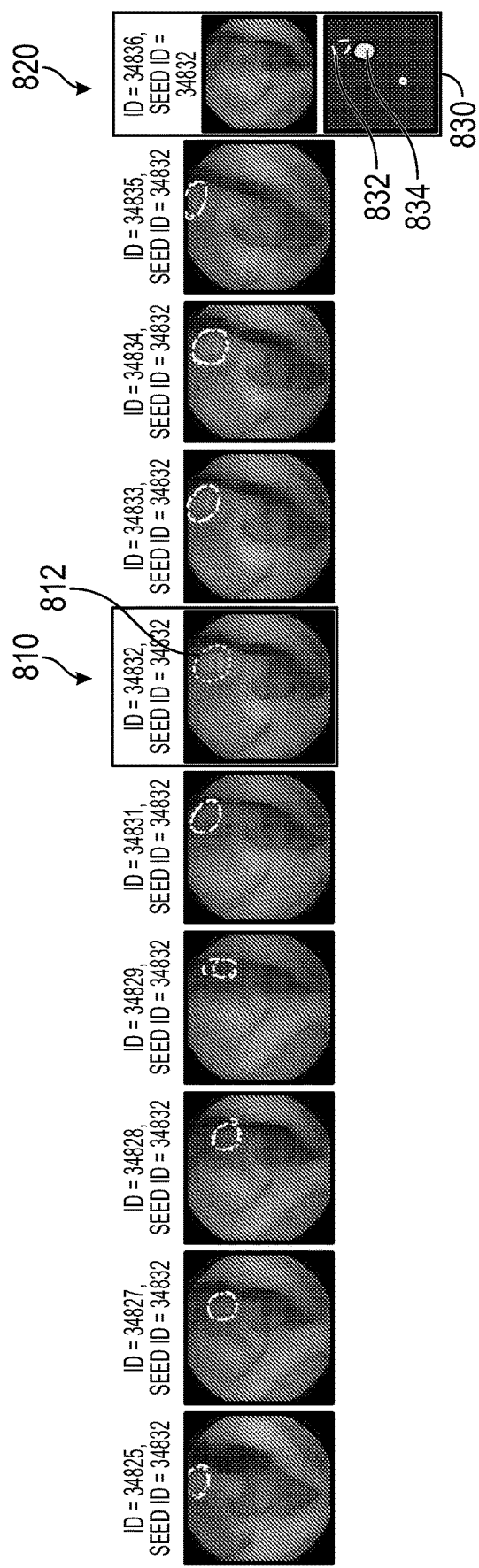
FIG. 8 is a diagram of an exemplary operation of applying consecutive-image tracking to images, in accordance with aspects of the present disclosure.

Referring now to FIG. 8, and in accordance with aspects of the present disclosure, there is shown a block diagram of an exemplary classification system (400, FIG. 4) that uses image trackers. An image tracker is an object tracking technique for identifying whether images that were captured close in time or close in sequence may contain the same object, e.g., the same occurrence of an event indicator. The object tracking technology is referred to herein as a "consecutive-image tracker" to indicate that the tracking technology is designed to identify small changes in an object between consecutive images/frames. As mentioned above, the phrase "consecutive images" means images which, when ordered in a sequence, are adjacent to each other in the sequence. Such tracking technology includes optical flow techniques, for example. Persons skilled in the art will understand how to implement optical flow techniques. Other technologies for tracking objects in consecutive images are contemplated to be within the scope of the present disclosure.

FIG. 8 shows an example of the consecutive-image tracking applied to a sequence of images containing a colon polyp. Starting with an initial image 810, which will be referred to as a "seed" image, the consecutive-image tracker processes adjacent images to track the polyp 812. In the illustrated example, the polyp 812 is tracked across five frames before the seed image 810 and across three frames after the seed image 810. At the fourth frame 820 after the seed image 810, the tracking ends by operation of the tracking technology. A graphical representation 830 of the tracking technology shows that the expected location 832 of the polyp is off from the actual location 834 of a polyp. Therefore, the polyp 812 was not tracked to that frame 820. The sequence of images tracked by a consecutive-image tracker based on a seed image will be referred to herein as an "image track" for the seed image.

Figure 9:
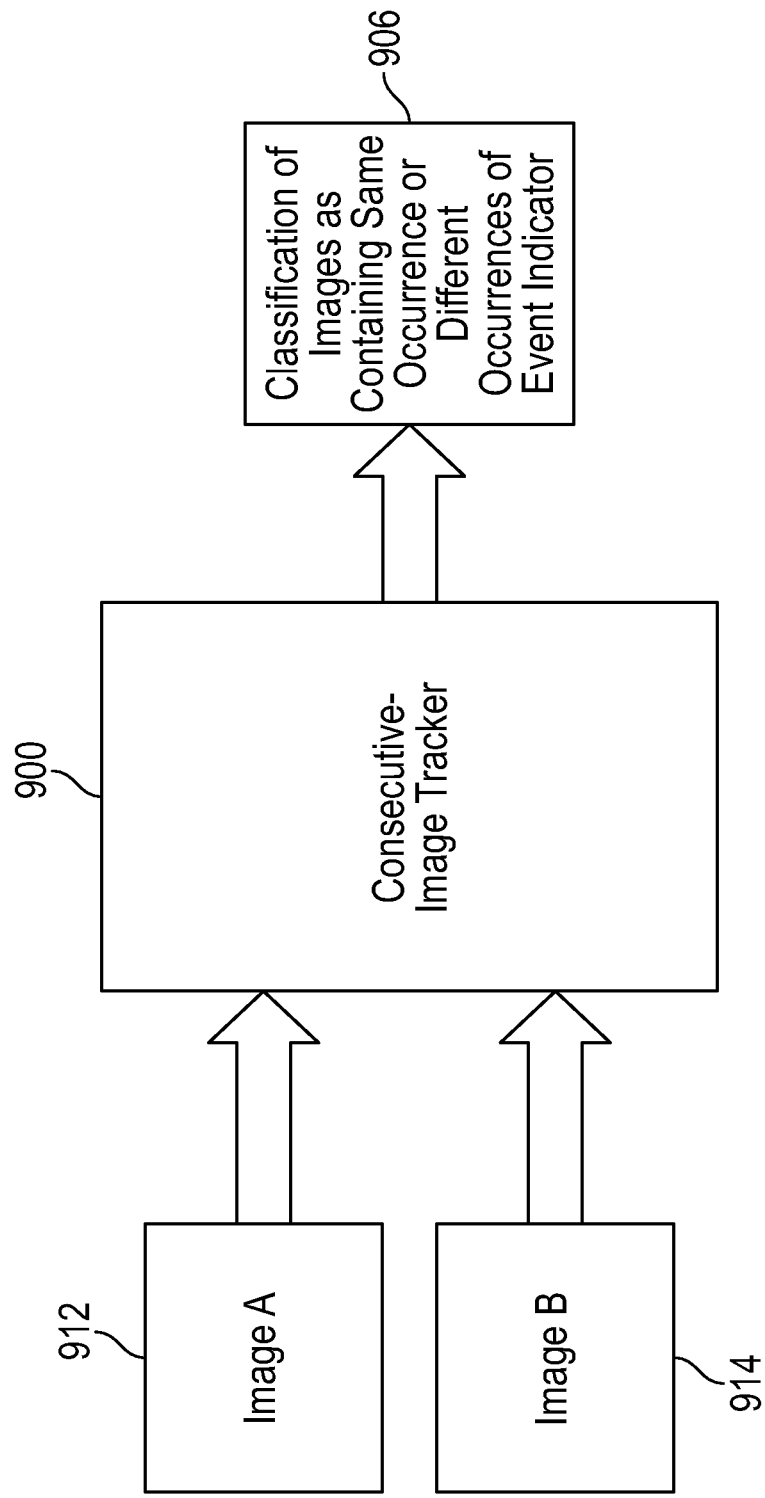
FIG. 9 is a block diagram of an exemplary classification system using a consecutive-image tracker, in accordance with aspects of the present disclosure.

In accordance with aspects of the present disclosure, and with reference to FIG. 9, a classification system 400 (FIG. 4) can use the consecutive-image tracker 900 to determine whether an occurrence of an event indicator in one image 912 can be tracked to the other image 914, thereby determining whether two images 912, 914 contain the same occurrence of an event indicator or different occurrences of the event indicator 906. In particular, the images 912, 914 are images in a sequence of images that may be separated by other images and, therefore, are not consecutive images. Additionally, the images 912, 914 may contain one or more occurrences of an event indicator, while one or more or all of the other images between the input images 912, 914 may not include any occurrences of the event indicator. Accordingly, the images 912, 914 are non-consecutive images, such that the consecutive-image tracker 900 is applied in a way that it was not designed to be applied. If the consecutive-image tracker 900 determines that an occurrence of an event indicator can be tracked between the two images 912, 914, then the consecutive image tracker 900 classifies the two images as containing the same occurrence of the event indicator. If the consecutive-image tracker 900 determines that an occurrence of an event indicator cannot be tracked between the two images 912, 914, then the consecutive image tracker 900 classifies the two images as containing different occurrences of the event indicator. Accordingly, the consecutive-image tracker 900 is applied to non-consecutive images in a way that it was not designed to be applied.

The illustrations of FIGS. 8 and 9 are exemplary. The consecutive-image tracker can be applied to event indicators other than colon polyps and can be applied to GIT segments other than a colon, such as a small bowel or such as individual segments of a colon or small bowel. When applied to a small bowel, event indicators may include ulcers, angioectasia, diverticulum, tumors, small bowel masses, and small bowel polyps, among others. Such applications are contemplated to be within the scope of the present disclosure. Other aspects of a consecutive-image tracker are described in U.S. Provisional Application No. 63/018,870, filed May 1, 2020, which is hereby incorporated by reference herein in its entirety.

Accordingly, various classification systems are described above for classifying two images as containing the same occurrence of an event indicator or containing different occurrences of an event indicator. The embodiments of FIGS. 5-9 are exemplary and other classification systems are contemplated to be within the scope of the present disclosure.

The following describes an example of a display screen and user interface for presenting images of event indicators to a clinician.

Figure 10:
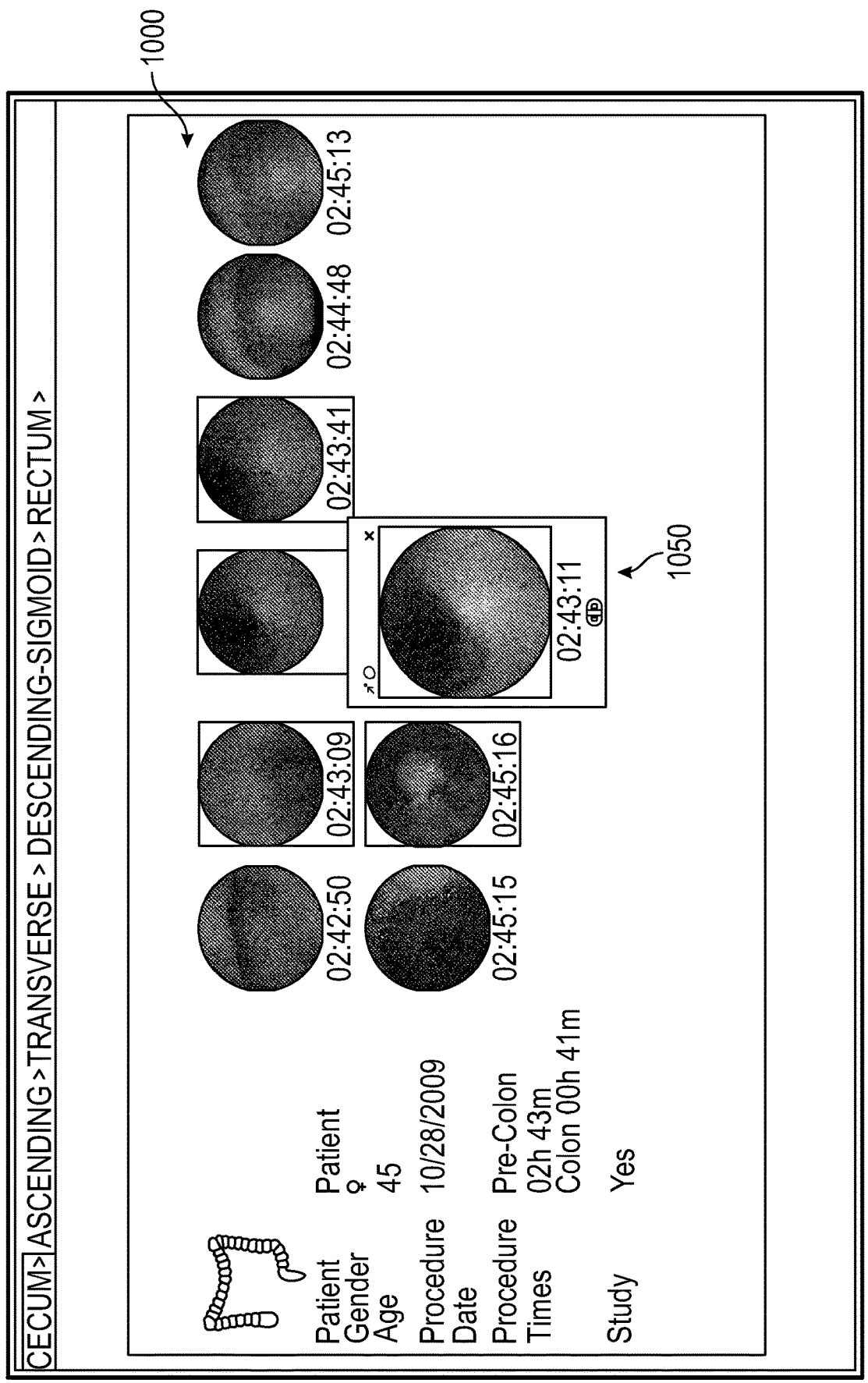
FIG. 10 shows an exemplary screen of a display or view, in accordance with aspects of the present disclosure.

FIG. 10 shows a screen of an exemplary display of a study of a capsule endoscopy (CE) procedure. A graphical user interface (e.g., of a study viewing application) may be used for displaying a study for a user's review and for generating a study report (or a CE procedure report). The study may be generated based on or may represent one or more predefined event indicators. The screen of FIG. 10 displays a set of still images 1000 included in the study. The user may review images 1050 and select one or more images 1050 which are of interest, e.g., displaying the one or more predefined event indicators. For example, the SB may include a plurality of pathologies of interest, including: ulcers, polyps, strictures etc. These pathologies may be predefined as event indicators for generating a study. As an example, in a colon procedure aimed for cancer screening, polyps may be of interest. FIG. 10 shows a display of a study of such colon procedure. The study images are displayed according to their location in the colon. The location may be any one of the following five anatomical colon segments: cecum, ascending, transverse, descending-sigmoid and rectum. The screen shows study images identified to be located in the cecum. The user may switch between display of images located in the different segments. The illustrated display screen may be used by the user, e.g., a clinician, to select the images to be included in the study report.

In accordance with aspects of the present disclosure, the systems and methods of the present disclosure can be applied in the process of generating a capsule endoscopy study, which is the process of identifying or selecting images to present to a reader of the study. In such an application, the computing system 300 of FIG. 3 can automatically employ the classification system 400 of FIG. 4 in the process of generating the study, without requiring any human input or intervention to utilize the classification system 400. For example, the disclosed systems and methods may be used to remove or reduce the number of images in the study (by identifying seed images of the same event indicator and removing them) and/or may be used to add images to an image track (e.g., images which were not identified by applying the consecutive tracker). Seed images and image tracks are discussed above in connection with FIG. 8. In general, the disclosed systems and methods may be used in the process of generating a capsule endoscopy procedure study, and specifically utilized in the selection of images to be displayed to the user or reader.

In accordance with aspects of the present disclosure, the classification system of the present disclosure can be used in conjunction with the display screen of FIG. 10 to inform a user whether two images selected by the user contain the same occurrence of an event indicator or contain different occurrences of the event indicator. Such information helps to inform users about whether they are viewing the same occurrence of an event indicator or different occurrences, thereby providing the users more information to make clinical assessments and diagnostic and therapeutic decisions. In accordance with aspects of the present disclosure, the classification system of the present disclosure can be applied after a user has selected an image of interest. The classification system can operate to determine whether other images contain the same occurrence of an event indicator as the selected image. For any other images which are determined to contain the same occurrence of the event indicator, the user interface can present such additional images to provide the user with additional views of the event indicator.

In accordance with aspects of the present disclosure, the classification system of the present disclosure can be applied to count the number of different occurrences of event indicators. In various embodiments, a capsule endoscopy study can present the number of different occurrences of event indicators identified in the study images. For example, in the case of polyps, if the number of different polyps exceeds a clinically significant number, a clinician may use that information to refer the patient to colonoscopy. As another example, in the case of ulcers, if the number of different ulcers changes between capsule endoscopy procedures, a clinician may use that information to tailor the patient's treatment.

In accordance with aspects of the present disclosure, the classification system of the present disclosure may be applied to images of the small bowel. If the classification system determines that two or more images include the same occurrence of an event indicator again and again, a clinician may use that information as an indication of a problem in the digestion for the patient.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A processing system comprising:
   at least one processor; and
   at least one memory storing instructions which, when executed by the at least one processor, cause the processing system to:
   access a first image and a second image of a portion of a gastrointestinal tract (GIT), the first image and the second image containing at least one occurrence of an event indicator; and
   classify the first image and the second image by a classification system configured to provide an indication of whether the first image and second image contain a same occurrence of the event indicator or contain different occurrences of the event indicator,
   wherein the classification system comprises a machine learning system,
   wherein the machine learning system is a neural network comprising an embedding layer configured to provide an embedding, the neural network configured to process the first image to provide an embedding of the first image and to process the second image to provide an embedding of the second image,
   wherein the classification system is further configured to:
   determine a distance between the embedding of the first image and the embedding of the second image; and
   compare the distance to at least one threshold to classify the first image and second image as containing the same occurrence of the event indicator or as containing different occurrences of the event indicator.

2. The processing system of claim 1, wherein the first image and the second image are images in a sequence of images, wherein the first image and the second image are separated in the sequence of images by at least one other image which does not contain an occurrence of the event indicator.

3. The processing system of claim 1, wherein the machine learning system is a deep learning neural network configured to provide a first score indicative of the first image and second image containing the same occurrence of the event indicator and provide a second score indicative of the first image and the second image containing different occurrences of the event indicator.

4. The processing system as claim 1, wherein the first image and the second image are captured during one of: during a same procedure, each during a separate procedure, or each during a different type of procedure.

5. The processing system of claim 1, wherein the neural network has a number n of hidden layers, wherein the embedding layer is located at a layer m among the n hidden layers, where $$m \geq \frac{n}{2}.$$

6. The processing system of claim 1, wherein the neural network is an autoencoder.

7. The processing system of claim 1, wherein the neural network is trained by triplet loss learning using image triplets comprising an anchor image, a positive image, and a negative image,
   wherein the neural network provides an embedding of the anchor image, an embedding of the positive image, and an embedding of the negative image, and
   wherein the triplet loss learning trains the neural network so that a distance between the embedding of the anchor image and the embedding of the positive image is decreased and a distance between the embedding of the anchor image and the embedding of the negative image is increased.

8. The processing system of claim 1, wherein the event indicator is a focal pathology,
   wherein the first image and the second image are cropped images containing at least one occurrence of the focal pathology,
   wherein the first and second cropped images have same pixel dimensions and include at least a portion of the focal pathology.

9. The processing system of claim 8, wherein the at least the portion of the focal pathology is centered in the first and second cropped images.

10. A processing system comprising:
   at least one processor; and
   at least one memory storing instructions which, when executed by the at least one processor, cause the processing system to:
      access a first image and a second image of a portion of a gastrointestinal tract (GIT), the first image and the second image containing at least one occurrence of an event indicator; and
      classify the first image and the second image by a classification system configured to provide an indication of whether the first image and second image contain a same occurrence of the event indicator or contain different occurrences of the event indicator,
   wherein the classification system includes:
      a first neural network trained to process an image captured by a first procedure device to provide an embedding; and
      a second neural network trained to process an image captured by a second procedure device to provide an embedding, the second procedure device being a different type of device than the first procedure device,
   wherein the classification system is configured to:
      determine a distance between the embedding provided by the first neural network and the embedding provided by the second neural network; and
      compare the distance to at least one threshold to classify the image captured by the first procedure device and the image captured by the second procedure device as containing the same occurrence of the event indicator or as containing different occurrences of the event indicator.

11. The processing system of claim 10, wherein the first neural network has a number n of hidden layers, wherein the embedding from the first neural network is located at a layer m among the n hidden layers, where $$m \geq \frac{n}{2},$$

and
   wherein the second neural network has a number k of hidden layers, wherein the embedding from the second neural network is located at a layer j among the k hidden layers, where $$j \geq \frac{k}{2}.$$

12. The processing system of claim 10, wherein the first neural network is an autoencoder and the second neural network is an autoencoder.

13. The processing system of claim 10, wherein the first procedure device is a capsule endoscopy device and the second procedure device is a device from a group consisting of: a colonoscopy scope and a double-balloon enteroscopy scope.

14. A computer-implemented method comprising:
   accessing a first image and a second image of a portion of a gastrointestinal tract (GIT) captured by a capsule endoscopy device, the first image and the second image containing at least one occurrence of an event indicator; and
   classifying the first image and the second image by a classification system configured to provide an indication of whether the first image and second image contain a same occurrence of the event indicator or contain different occurrences of the event indicator,
   wherein the classification system comprises a machine learning system,
   wherein the machine learning system is a neural network comprising an embedding layer configured to provide an embedding, the neural network configured to process the first image to provide an embedding of the first image and to process the second image to provide an embedding of the second image,
   wherein the classification system is further configured to:
      determine a distance between the embedding of the first image and the embedding of the second image; and
      compare the distance to at least one threshold to classify the first image and second image as containing the same occurrence of the event indicator or as containing different occurrences of the event indicator.

15. The computer-implemented method of claim 14, wherein the classification system comprises a machine learning system and does not comprise an image tracker,
   wherein the first image and the second image are images in a sequence of images, wherein the first image and the second image are separated in the sequence of images by at least one other image which does not contain an occurrence of the event indicator.

* * * * *